United States Patent
Yamaguchi

(10) Patent No.: US 10,818,485 B2
(45) Date of Patent: Oct. 27, 2020

(54) MULTIDIMENSIONAL MASS SPECTROMETRY DATA PROCESSING DEVICE

(71) Applicant: SHIMADZU CORPORATION, Kyoto-shi, Kyoto (JP)

(72) Inventor: Shinichi Yamaguchi, Kyoto (JP)

(73) Assignee: SHIMADZU CORPORATION, Kyoto-shi, Kyoto (JP)

(*) Notice: Subject to any disclaimer, the term of this patent is extended or adjusted under 35 U.S.C. 154(b) by 422 days.

(21) Appl. No.: 15/532,534

(22) PCT Filed: Dec. 8, 2014

(86) PCT No.: PCT/JP2014/082384
§ 371 (c)(1),
(2) Date: Jun. 2, 2017

(87) PCT Pub. No.: WO2016/092608
PCT Pub. Date: Jun. 16, 2016

(65) Prior Publication Data
US 2017/0271135 A1    Sep. 21, 2017

(51) Int. Cl.
*G01N 33/48* (2006.01)
*G01N 33/50* (2006.01)
(Continued)

(52) U.S. Cl.
CPC .......... *H01J 49/0036* (2013.01); *G01N 27/62* (2013.01); *G06K 9/6209* (2013.01);
(Continued)

(58) Field of Classification Search
None
See application file for complete search history.

(56) References Cited

U.S. PATENT DOCUMENTS

| 6,737,641 B2* | 5/2004 | Kato | H01J 49/0095 |
| | | | 250/281 |
| 2007/0039375 A1* | 2/2007 | Chaintreau | G01N 30/463 |
| | | | 73/23.41 |

(Continued)

FOREIGN PATENT DOCUMENTS

| CN | 104112643 A | 10/2014 |
| EP | 2 797 104 A2 | 10/2014 |

(Continued)

OTHER PUBLICATIONS

English Machine translation of Yamaguchi S. JP2013-145245A (published Jul. 25, 2013). Translation obtained on Aug. 25, 2019.*

(Continued)

*Primary Examiner* — Russell S Negin
(74) *Attorney, Agent, or Firm* — Sughrue Mion, PLLC

(57) ABSTRACT

For a sample whose components are separated from each other, an $MS^2$ analysis is repeatedly performed by an MS/MS unit to obtain $MS^2$ spectra. Peak information is collected from the $MS^2$ spectrum acquired for each micro area on a two-dimensional chromatogram. A principal component analysis processor performs a principal component analysis on the collected peak information to determine a principal component score reflecting an overall tendency of the peak pattern of the $MS^2$ spectra. A factor loading calculator computes a factor loading for each m/z from the principal component score. A correlation information calculator computes the coefficient of correlation between each $MS^2$ spectrum and the factor loadings. Since the $MS^2$ spectra reflect the chemical structure of a contained component, a two-dimensional image created based on the coefficient of correlation shows the distribution of a component having a similar chemical structure to a component which is characteristically contained in the sample.

12 Claims, 3 Drawing Sheets

(51) Int. Cl.
*H01J 49/00* (2006.01)
*G01N 27/62* (2006.01)
*G06K 9/62* (2006.01)
*H01J 49/26* (2006.01)
*G06K 9/48* (2006.01)

(52) U.S. Cl.
CPC ......... *G06K 9/6221* (2013.01); *G06K 9/6232* (2013.01); *G06K 9/6265* (2013.01); *H01J 49/26* (2013.01); *G06K 2009/487* (2013.01)

(56) References Cited

U.S. PATENT DOCUMENTS

| | | | |
|---|---|---|---|
| 2013/0124102 A1 | 5/2013 | Tate et al. | |
| 2014/0316717 A1 | 10/2014 | Ikegami et al. | |

FOREIGN PATENT DOCUMENTS

| | | | |
|---|---|---|---|
| JP | 2009-025268 A | 2/2009 | |
| JP | 2011-122822 A | 6/2011 | |
| JP | 2012-002544 A | 1/2012 | |
| JP | 2013-040808 A | 2/2013 | |
| JP | 2013-145245 A | 7/2013 | |
| WO | 2010/129851 A1 | 11/2010 | |

OTHER PUBLICATIONS

Gassier N. Methods in comprehensive mass spectrometry-based measurement of sphingolipids. Journal of Glycomics & Lipidomics, S:2, 3 pages. (Year: 2012).*
Communication dated Feb. 28, 2019 from the State Intellectual Property Office of the P.R.C. in counterpart Application No. 201480083975.3.
Allison L. Dill, et al., "Lipid Profiles of Canine Invasive Transitional Cell Carcinoma of the Urinary Bladder and Adjacent Normal Tissue by Desorption Electrospray Ionization Imaging Mass Spectrometry", Analytical Chemistry, Oct. 7, 2009, pp. 8758-8764, vol. 81, No. 21.
"GC Image GCxGC Software", [online], GC Image LLC, [accessed on Nov. 10, 2014], the Internet <URL: http://www.gcimage.com/gcxgc/index.html>.
"GCxGC System", Shimadzu Corporation, [accessed on Nov. 10, 2014], the Internet <URL: http://www.an.shimadzu.co.jp/gcms/gcxgc/apl.htm>.
Chen Wang, et al., "Screening of antinociceptive components in Corydalis yanhusuo W.T. Wang by comprehensive two-dimensional liquid chromatography/tandem mass spectrometry", Analytical and Bioanalytical Chemistry, Jan. 26, 2010, pp. 1731-1740, vol. 396, Issue 5.
International Search Report of PCT/JP2014/082384, dated Jan. 27, 2015. [PCT/ISA/210].
Written Opinion dated Jan. 27, 2015 in application No. PCT/JP2014/082384.
Communication dated Nov. 15, 2017 from the European Patent Office in counterpart Application No. 14907864.4.

* cited by examiner

TWO-DIMENSIONAL CHROMATOGRAM

SPECTRUM DATA AT EACH PIXEL

Fig. 3
| | RT1 | RT2 | Pre. m/z | Pro.m/z | | | | N.loss m/z | |
|---|---|---|---|---|---|---|---|---|---|
| | | | | m/z100 | m/z101 | m/z102 | ------- | m/z10 | ------- |
| spec1 | | | | | | | | | |
| spec2 | | | | | | | | | |
| spec3 | | | | | | | | | |
| ⋮ | ⋮ | ⋮ | ⋮ | ⋮ | ⋮ | ⋮ | | ⋮ | |
MATRIX
Fig. 4
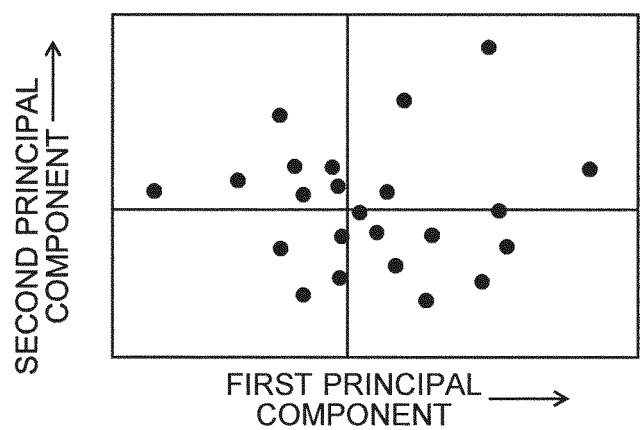
Fig. 5
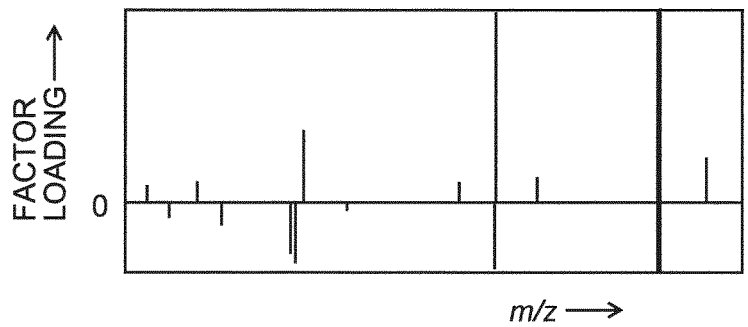

MULTIDIMENSIONAL MASS SPECTROMETRY DATA PROCESSING DEVICE

CROSS REFERENCE TO RELATED APPLICATIONS

This application is a National Stage of International Application No. PCT/JP2014/082384 filed Dec. 8, 2014, the contents of all of which are incorporated herein by reference in their entirety.

TECHNICAL FIELD

The present invention relates to a mass spectrometric data processing device for processing data collected by mass spectrometry and displaying the processing result, and more specifically, to a multidimensional mass spectrometric data processing device for processing mass spectrometric data acquired for each micro area within an N-dimensional area on a real space or on a non-real, virtual space, and for displaying the processing result. As concrete examples, the multidimensional mass spectrometric data processing device according to the present invention can be used for processing mass spectrometric data acquired by a device including a comprehensive two-dimensional gas chromatograph (GC), comprehensive two-dimensional liquid chromatograph (LC), or similar apparatus combined with a mass spectrometer, or by an imaging mass spectrometer.

BACKGROUND ART

As one technique for gas chromatography, a technique called the "comprehensive two-dimensional GC" or "GC×GC" has been commonly known (see Patent Literature 1 or other documents). In the comprehensive two-dimensional GC, various components contained in a target sample are initially separated by a column which is the first dimension (which is hereinafter called the "primary column"), and the thereby eluted components are introduced into a modulator. The modulator repeats an operation including the steps of capturing the introduced components at regular intervals of modulation time (which is normally within a range from a few seconds to approximately one dozen seconds), detaching those components with an extremely narrow time bandwidth, and introducing them into a column which is the second dimension (which is hereinafter called the "secondary column"). The component separation in the primary column is normally performed under such a separation condition that the elution occurs at a rate approximately equal to or slightly lower than the rate in a commonly used GC. On the other hand, as compared to the primary column, the column used as the secondary column has a different polarity, shorter length and smaller inner diameter, with the component separation performed under such a condition that each elution will be completed within the specified modulation time.

In this manner, in the comprehensive two-dimensional GC, a plurality of components which have not been separated by the primary column and whose peaks overlap each other can be separated in the secondary column, whereby the separation performance is dramatically improved as compared to normal GCs.

A similar technique to the comprehensive two-dimensional GC is also known in the field of liquid chromatographic analysis, which uses two columns having different separation characteristics and is called the "comprehensive two-dimensional LC" or "LC×LC". In the present description, both the comprehensive two-dimensional GC and the comprehensive two-dimensional LC are collectively called the "comprehensive two-dimensional chromatograph".

In many cases, in those comprehensive two-dimensional chromatographs, the two columns have different separation characteristics. Therefore, in order to present the state of separation in each column in an easily comprehensible form, a two-dimensional chromatogram having two orthogonal axes which respectively indicate the retention time in the primary column and the retention time in the secondary column is created, with the signal intensity represented by contour lines, color scale, or gray scale. FIG. 6 is one example of the two-dimensional chromatogram. As a data processing software product for creating two-dimensional chromatograms, "GC Image" offered by GC Image LLC is commonly known (see Non-Patent Literature 1).

As noted earlier, comprehensive two-dimensional chromatographs have a high level of separation capability. However, for the identification or quantitative determination of various components in a sample which contains a number of components having close retention times or one which contains a comparatively high amount of foreign substances, it is useful to combine a comprehensive two-dimensional chromatograph with a mass spectrometer, and particularly, with a triple quadrupole mass spectrometer, ion-trap time-of-flight mass spectrometer or similar type of mass spectrometer capable of an $MS^n$ analysis (see Non-Patent Literature 2 or other document). For example, in the triple quadrupole mass spectrometer, an ion having a specific mass-to-charge ratio originating from a compound is selected as a precursor ion. This precursor ion is subsequently fragmented by collision induced dissociation (CID), and the thereby generated product ions are exhaustively detected, i.e. by a scan measurement. Such a technique of $MS^n$ analysis is called the "product ion scan measurement". Based on the peak pattern on an $MS^2$ spectrum obtained by this measurement, it is possible to investigate fragments which result from the breakage of bonds at various sites in a specific chemical structure.

In a comprehensive two-dimensional LC or comprehensive two-dimensional GC using a triple quadrupole mass spectrometer as the detector, a two-dimensional chromatogram displayed as an analysis result corresponds to a normal total ion chromatogram. In many cases, only a component having a high signal intensity, i.e. a component contained in a relatively greater amount, is displayed on the two-dimensional chromatogram. Needless to say, this type of conventional analyzing system is provided with the function of superposing a compound name or similar information in relation to a peak on the two-dimensional chromatogram when a contained component is identified by an identification process using the retention time and/or mass spectrum ($MS^n$ spectrum). Such a display allows analysis operators to know what kind of component is contained in the sample. However, it is extremely difficult for normal operators, except those who have high levels of expertise on compounds, to intuitively understand where structurally similar components have been detected.

In an imaging mass spectrometer, as disclosed in Patent Literature 2, a mass spectrum or $MS^n$ spectrum can be obtained for each of a large number of micro areas within a two-dimensional area on a sample. Based on the obtained result, a mapping image can be obtained which shows the signal intensity distribution at a specific mass-to-charge ratio corresponding to the two-dimensional area being analyzed. Such a mapping image is also a two-dimensional distribution of the intensity of the ion having a specific mass-to-charge ratio. Accordingly, in some cases, it is not always the case that the image actually shows the distribution of the specific component, due to such reasons as an incorrect selection of the mass-to-charge ratio.

CITATION LIST

Patent Literature

Patent Literature 1: JP 2011-122822 A
Patent Literature 2: JP 2009-25268 A
Patent Literature 3: JP 2012-2544 A Non Patent Literature Non Patent Literature 1: "GC Image GC×GC Software", [online], GC Image LLC, [accessed on Nov. 10, 2014], the Internet
Non Patent Literature 2: "GC×GC System", Shimadzu Corporation, [accessed on Nov. 10, 2014], the Internet

SUMMARY OF INVENTION

Technical Problem

The present invention has been developed in view of the previously described problem. Its main objective is to provide a multidimensional mass spectrometric data processing device capable of creating and displaying a distribution image which is easy to intuitively comprehend, such as the distribution of a specific component or that of components having similar structures, on a two-dimensional display, such as a two-dimensional chromatogram in a comprehensive two-dimensional chromatograph or a mapping image in an imaging mass spectrometer.

Solution to Problem

The present invention developed for solving the previously described problem is a multidimensional mass spectrometric data processing device for processing and displaying multidimensional mass spectrometric data acquired for one sample using a mass spectrometer capable of an $MS^n$ analysis (where n is an integer equal to or greater than two), the multidimensional mass spectrometric data including $MS^n$ spectrum data at each micro area on an N-dimensional space which is a real space or virtual space (where N is an integer equal to or greater than two), and the device including:

a) a peak information collector for collecting, for each micro area, peak information showing a relationship between the mass-to-charge ratio and a signal intensity, from the $MS^n$ spectrum data at each micro area on the N-dimensional space;

b) a statistical analyzer for determining a statistical feature quantity by performing a predetermined statistical analytical process on the peak information on the N-dimensional space collected by the peak information collector, and for acquiring information showing the correlation between the statistical feature quantity and the peak information of each micro area; and c) a graph creator for creating a graph showing an intensity distribution in the N-dimensional space based on the information showing the correlation of each micro area obtained by the statistical analyzer.

Typical examples of the mass spectrometer capable of an $MS^n$ analysis include: a triple quadrupole mass spectrometer or Q-TOF mass spectrometer in which two mass analyzers are placed before and after a collision cell; an ion-trap mass spectrometer or ion-trap time-of-flight mass spectrometer provided with an ion trap; and a TOF-TOF mass spectrometer employing high-energy CID. In principle, in some devices, such as the triple quadrupole mass spectrometer or TOF-TOF mass spectrometer, the value of n is limited to two (except in the case of making use of the in-source decay, as will be described later). On the other hand, for the ion-trap mass spectrometer or similar devices, there is no theoretical limitation on the value of n (practically, the largest possible value of n is 5 or 6).

In the first mode of the multidimensional mass spectrometric data processing device according to the present invention, the $MS^n$ spectrum data at each micro area are data obtained by a comprehensive two-dimensional GC or comprehensive two-dimensional LC using the mass spectrometer capable of an $MS^n$ analysis as a detector, and the two axes of a two-dimensional space with N having a value of 2 are both retention times. In this case, the two-dimensional space is a virtual space.

In the second mode of the multidimensional mass spectrometric data processing device according to the present invention, the $MS^n$ spectrum data at each micro area are data obtained by an imaging mass spectrometer capable of an $MS^n$ analysis, and the two axes of a two-dimensional space with N having a value of 2 are position information in different directions on a sample. In this case, the two-dimensional space is naturally a real space.

In still another mode of the multidimensional mass spectrometric data processing device according to the present invention, the $MS^n$ spectrum data at each micro area are data acquired by a normal LC or GC using a mass spectrometer capable of an $MS^n$ analysis as a detector, and one of the two axes of a two-dimensional space with N having a value of 2 is the retention time while the other axis is the mass-to-charge ratio of the precursor ion used when the $MS^n$ spectrum data are acquired. In this case, the two-dimensional space is also a virtual space and not a real space.

For example, in the first mode of the present invention, mass spectrum data and $MS^2$ spectrum data are acquired at each micro area in a two-dimensional virtual space having two time axes, i.e. the retention time in the primary column and the retention time in the second column. It should be noted that the plurality of micro areas may have the same mass-to-charge ratio of the precursor ion or different mass-to-charge ratios specified for the $MS^2$ analysis. For example, different mass-to-charge ratios of the precursor ion are normally specified in the case of determining the precursor ion by automatically selecting a peak which satisfies previously specified conditions concerning the peaks located on a mass spectrum (e.g. in the case of using the auto $MS^n$ function described in Patent Literature 3). On the other hand, the same mass-to-charge ratio of the precursor ion is specified in the case where the mass-to-charge ratio of the precursor ion is previously specified as one of the analysis conditions.

The peak information collector collects, from the $MS^2$ spectrum data at each micro area on the two-dimensional space, a piece of peak information showing a relationship between the mass-to-charge ratio and the signal intensity for each micro area. According to the purpose of the analysis or other factors, the peak information collector may collect peak information under the condition that the mass-to-charge ratio of the precursor ion used in the $MS^2$ analysis is the same, or it may collect peak information regardless of the mass-to-charge ratio of the precursor ion. Specifically, the peak information collector may be configured to perform a peak detection process on an $MS^2$ spectrum under predetermined conditions, determine the mass-to-charge ratio and signal intensity corresponding to the peak top, and collect the signal intensity values corresponding to a mass-to-charge ratio value obtained in at least one of all $MS^2$ spectra (if no peak is present at the mass-to-charge ratio value concerned, the signal intensity value is zero). Neutral losses, i.e. the difference between the mass-to-charge ratio of the peak top of each peak located on the $MS^2$ spectrum and the mass-to-charge ratio of the precursor ion, may also be included in the peak information, since a neutral loss represents the mass of a partial structure detached in the dissociation process. The pieces of peak information respectively obtained for the plurality of $MS^2$ spectra are compiled into a matrix format.

The statistical analyzer performs a predetermined statistical analytical process on the peak information in the matrix format. Examples of the available techniques for the statistical analysis include multivariate analyses, such as the principal component analysis, factor analysis, partial least-squares method (PLS), PLS determination analysis method (PLS-DA), and cluster analysis, as well as analyses utilizing neural networks, such as the self-organizing map (SOM) analysis. A typical choice is the principal component analysis, in which case the factor loading on a specific principal component (e.g. first principal component) obtained by the principal component analysis can be used as the feature quantity. The factor loading is determined for each mass-to-charge ratio value, and therefore, can be represented in a similar form to a mass spectrum (which is hereinafter conveniently referred to as the "factor loading spectrum"). An index, e.g. the coefficient of correlation, which represents the correlation between the peak information in the factor loading spectrum and the peak information of each micro area is calculated. This coefficient of correlation obtained for each micro area reflects the degree of similarity in chemical structure to a component which is characteristic of the entire set of $MS^2$ spectrum data. Therefore, the graph created by the graph creator shows the distribution of this characteristic component and other components having similar chemical structures to the characteristic component. This graph can be displayed, for example, on the screen of a display unit.

In the second mode of the present invention, a graph showing the distribution of a characteristic component and other components having similar chemical structures to the characteristic component which exists within a two-dimensional area on a sample can be created and displayed by a similar process to the previously described one.

The accuracy of the statistical analytical process becomes low if there is a difference in sensitivity for each micro area. In particular, in the case of using an imaging mass spectrometer and performing an ionization at different sites on a sample by matrix assisted laser desorption ionization (MALDI) or other methods, a sensitivity difference depending on the site easily occurs due to such factors as a non-uniformity in the mixture of the matrix. When such a situation is expected, it is preferable to perform a normalization of the signal intensity values so as to compensate a variation in signal intensity value among the micro areas in advance of the statistical analytical process. Specifically, the normalization may be performed so as to equalize the intensity value of the peak having the highest signal intensity in each $MS^2$ spectrum, or equalize the accumulated value of the signal intensities of all peaks in each $MS^2$ spectrum. The normalization may also be performed so as to equalize the signal intensity of the precursor ion on the mass spectrum.

The $MS^2$ analysis in the present context is not limited to an analysis in which a specific kind of ion is intentionally dissociated by means of a collision cell, ion trap or similar device and subjected to a mass spectrometry; it also includes an analysis in which a mass spectrum that can be practically regarded as such is obtained. For example, in an ion source employing an electron ionization method which is commonly used in GC-MS or other devices, fragmentations easily occur in the ionization process, so that the molecular ions resulting from the original component are barely observed. As another example, increasing the power of the laser beam in the MALDI ion source causes in-source decay to easily occur. A similar fragmentation of the ions also easily occurs in the ionization process by laser desorption ionization (LD), secondary ion mass spectrometry (SIMS), fast atom bombardment (FAB) or other techniques. A mass spectrum obtained under any of those conditions is a "pseudo" $MS^2$ spectrum in which a number of fragment ions can be observed.

Accordingly, in the multidimensional mass spectrometric data processing device according to the present invention, the mass spectrometer may be a device including an ion source in which a fragmentation easily occurs or a device which employs in-source decay, and the $MS^n$ spectrum data may be pseudo $MS^2$ spectrum data acquired by performing a mass spectrometry on fragment ions resulting from the fragmentation or in-source decay in the ion source.

Needless to say, a mass spectrometer which is provided with a collision cell or ion trap and capable of dissociating ions in those devices allows for the use of a fragmentation or in-source decay in the ionization process so as to perform a pseudo $MS^n$ analysis with n being equal to or greater than three.

Advantageous Effects of the Invention

The multidimensional mass spectrometric data processing device according to the present invention can create and display a distribution image which is easy to intuitively comprehend, such as the distribution of a specific component or that of components having similar structures, for a two-dimensional display image, such as a two-dimensional chromatogram in a comprehensive two-dimensional chromatograph or a mapping image in an imaging mass spectrometer.

BRIEF DESCRIPTION OF DRAWINGS

FIG. 3 is a diagram showing one example of the peak information in the comprehensive two-dimensional LC-MS/MS system of the present embodiment.

FIG. 4 is a diagram showing one example of the result of a principal component analysis in the comprehensive two-dimensional LC-MS/MS system of the present embodiment.

FIG. 5 is a diagram showing one example of the factor loading spectrum created in the comprehensive two-dimensional LC-MS/MS system of the present embodiment.

DESCRIPTION OF EMBODIMENTS

One embodiment of the comprehensive two-dimensional LC-MS/MS system using a multidimensional mass spectrometric data processing device according to the present invention is hereinafter described with reference to the attached drawings.

Figure 1:
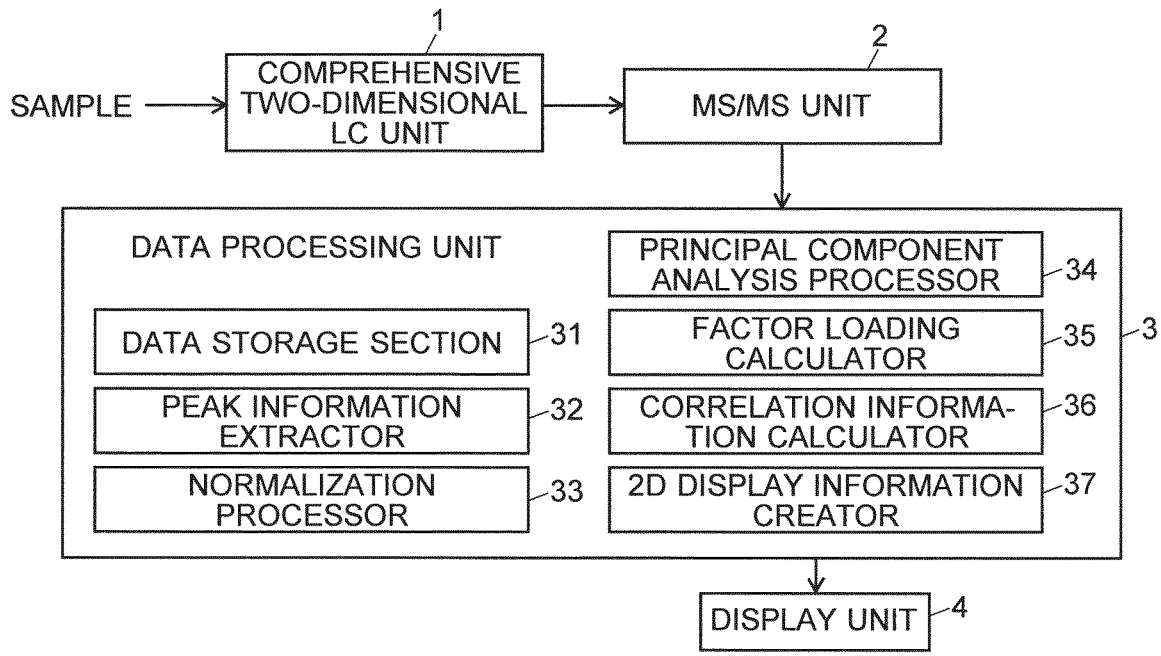
FIG. 1 is a schematic configuration diagram of one embodiment of the comprehensive two-dimensional LC-MS/MS system using a multidimensional mass spectrometric data processing device according to the present invention.

FIG. 1 is a schematic configuration diagram of the comprehensive two-dimensional LC-MS/MS system according to the present embodiment.

The comprehensive two-dimensional LC-MS/MS system in the present embodiment includes a comprehensive two-dimensional LC unit 1, MS/MS unit 2, data processing unit 3 and display unit 4. Though not shown, the comprehensive two-dimensional LC unit 1 includes: a pump for supplying a mobile phase; an injector for injecting a sample into the mobile phase; a primary column; a modulator for capturing components eluted from the exit port of the primary column at regular intervals of time (modulation time) and sending those components in a temporally compressed form; and a secondary column having a different separation characteristic (typically, a different polarity) from that of the primary column and being capable of high-speed separation. The various components contained in the sample injected into the mobile phase by the injector are temporally separated and eluted with a high level of separating power by the primary and secondary columns. Those components are continuously introduced into the MS/MS unit 2.

Though not shown, the MS/MS unit 2 is a triple quadrupole mass spectrometer provided with an atmospheric pressure ion source employing an electrospray ionization (ESI) or similar method, a front quadrupole mass filter, a collision cell, a rear quadrupole mass filter and an ion detector. Needless to say, the MS/MS unit 2 is not limited to a mass spectrometer having such a configuration, but may be replaced by a mass spectrometer having a different configuration, such as a Q-TOF mass spectrometer or ion-trap time-of-flight mass spectrometer.

In the MS/MS unit 2, the components contained in the sample liquid supplied from the comprehensive two-dimensional LC unit 1 are sequentially ionized by the atmospheric pressure ion source. For the ions thus generated, a measurement using the auto $MS^2$ function mentioned earlier is performed in the front quadrupole mass filter, collision cell and rear quadrupole mass filter. That is to say, a scan measurement over a previously specified range of mass-to-charge ratios is initially performed without dissociating ions in the collision cell. When a peak which satisfies predetermined conditions is detected on a mass spectrum created by the measurement, an $MS^2$ analysis (product ion scan measurement) in which the ion corresponding to the detected peak is designated as the precursor ion is performed in almost real time, i.e. immediately after the scan measurement. As a result, an $MS^2$ spectrum corresponding to a significant peak observed on the mass spectrum is obtained. If no significant peak is present on the mass spectrum, no $MS^2$ analysis is performed, and no $MS^2$ spectrum is obtained.

The signals continuously obtained in the MS/MS unit 2 are converted into digital data (mass spectrum data or $MS^2$ spectrum data) by an analogue-to-digital converter (not shown) and fed to the data processing unit 3 and stored in a data storage section 31. In addition to the data storage section 31, the data processing unit 3 includes a peak information extractor 32. normalization processor 33, principal component analysis processor 34, factor loading calculator 35, correlation information calculator 36, two-dimensional display information creator 37 and other functional blocks, in order to perform the characteristic processing which will be described later.

The data processing unit 3 can be constructed using a personal computer as a hardware resource, with the aforementioned functions realized by executing, on this personal computer, a dedicated processing software program previously installed on the same computer.

Figure 2A:
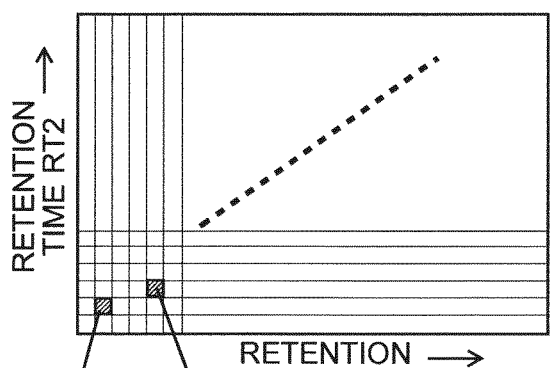
FIGS. 2A and 2B are schematic diagrams of data obtained by a measurement in the comprehensive two-dimensional LC-MS/MS system of the present embodiment.
Figure 2B:
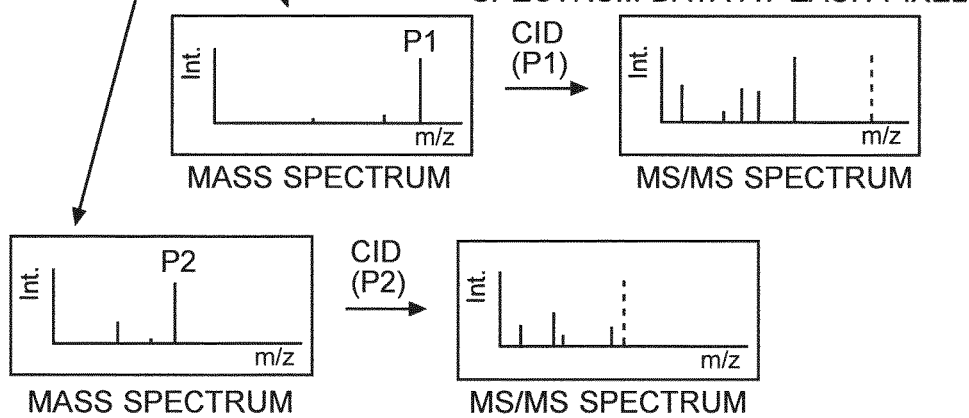
Figure 6:
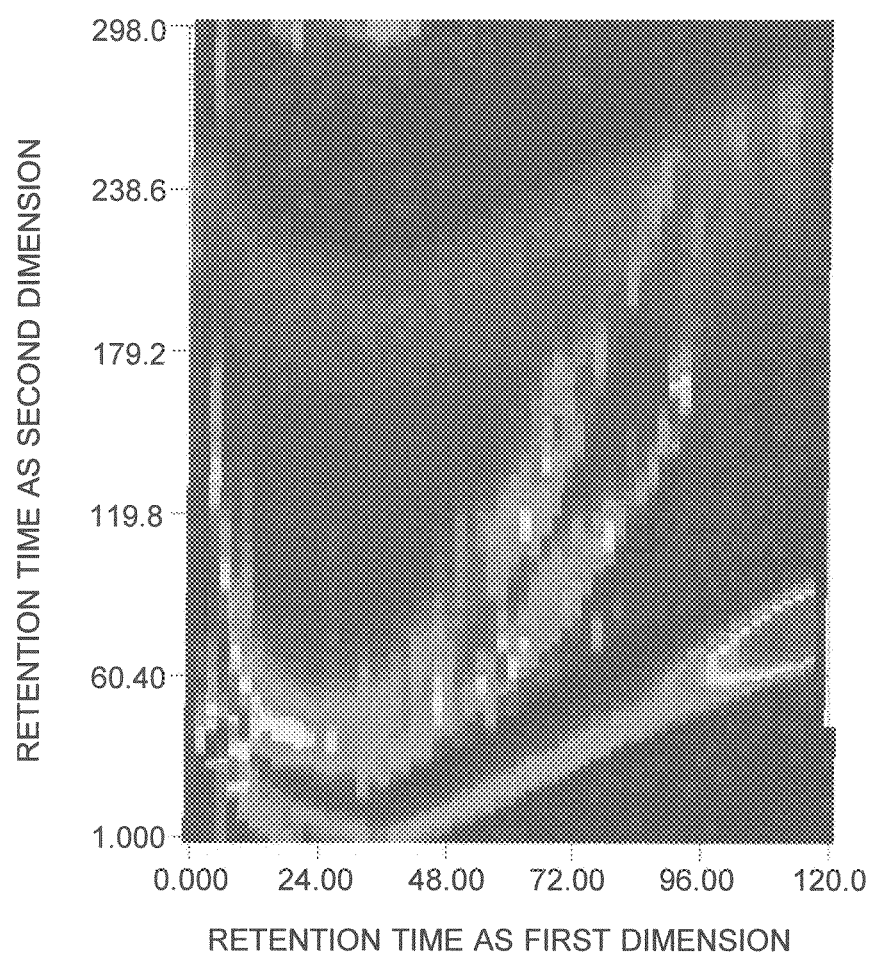
FIG. 6 is a diagram showing one example of the comprehensive two-dimensional chromatogram.

FIGS. 2A and 2B are schematic diagrams of data obtained by a measurement in the comprehensive two-dimensional LC-MS/MS system of the present embodiment.

As explained earlier, the various components contained in the sample are separated from each other in a temporal direction with a high level of separating power in the comprehensive two-dimensional LC unit 1, while a scan measurement is repeatedly performed in the MS/MS unit 2. When a significant peak has been located on the mass spectrum obtained by the scan measurement, an $MS^2$ analysis (product ion scan measurement) is carried out in an intermission of the scan measurement. As a result, as shown in FIGS. 2A and 2B, mass spectrum data corresponding to each micro area (i.e. each pixel which is shown as a shaded square range in FIG. 2A) on a virtual space having two time axes, i.e. the retention time RT1 in the primary column and the retention time RT2 in the secondary column, are stored in the data storage section 31. $MS^2$ spectrum data corresponding to some or all of those micro areas are also stored.

In the data processing unit 3, the data thus stored are processed as follows:

The peak information extractor 32 reads $MS^2$ spectrum data of each micro area from the data storage section 31. Then, it performs a peak detection on each $MS^2$ spectrum according to a predetermined algorithm and acquires the mass-to-charge ratio value and signal intensity value of the peak top of each detected peak. Those are the mass-to-charge ratio values and signal intensity values of the product ions. Furthermore, the peak information extractor 32 determines the mass values and signal intensity values of neutral losses in such a manner that the difference between the mass-to-charge ratio value of the precursor ion used in the $MS^2$ analysis and that of each of the product ions is calculated as a neutral loss detached from the ion in the dissociation process, while the signal intensity values of the peaks of the product ions used in the calculation of the neutral losses are regarded as the signal intensity values of the neutral losses.

After the peak information for all $MS^2$ spectra. i.e. the mass-to-charge ratio values and signal intensity values of the product ions as well as the mass values and signal intensity values of the neutral losses, have been obtained, those pieces of data are organized into a matrix format so that the principal component analysis can be performed. That is to say, the mass-to-charge ratio values of the product ions and the mass values of the neutral losses for all $MS^2$ spectra are extracted. The mass-to-charge ratio values of all product ions and the mass values of all neutral losses are arranged as the horizontal parameter of the matrix, while the serial numbers of the $MS^2$ spectra are arranged as the vertical parameter. The signal intensity values of the product ions and those of the neutral losses obtained from one $MS^2$ spectrum are written as the elements in one row (see FIG. 3).

If there is no signal intensity value corresponding to the mass-to-charge ratio value of a product ion or the mass value of a neutral loss, a value of zero is given to the element concerned. In this manner, all pieces of peak information for all spectra are compiled into one matrix. The number of rows of this matrix equals the total number of $MS^2$ spectra, while the number of columns equals the total number of mass-to-charge ratio values of the product ions and mass values of the neutral losses extracted from all $MS^2$ spectra.

Next, the normalization processor 33 normalizes the elements on the matrix, i.e. the signal intensity values, so as to reduce the variation among the $MS^2$ spectra. For example, it searches each $MS^2$ spectrum for a product ion having the largest signal intensity value, divides this signal intensity value by a predetermined value to obtain a coefficient, and corrects all signal intensity values in the same $MS^2$ spectrum by multiplying the signal intensity values by that coefficient. In this manner, the signal intensity values in each $MS^2$ spectrum can be normalized so that all $MS^2$ spectra have equal largest signal intensity values. The method of normalization is not limited to the preset example. No normalization is required if there is only a minor variation in signal intensity among the measurements.

Subsequently, the principal component analysis processor 34 performs a principal component analysis on the matrix. For example, "first" and "second" principal components are determined, and scores for those principal components are calculated. Calculation methods for the principal component analysis are commonly known and will not be explained in the present description. A principal component analysis normally yields a principal component score plot, as shown in FIG. 4, on which each $MS^2$ spectrum is related to one plot. Next, for ease of comparison of the results of the principal component analysis, the factor loading calculator 35 computes the principal component loadings (which are also called the "factor loadings") from the principal component scores. One principal component loading is obtained for each mass-to-charge ratio value as well as for each mass value. Accordingly, by graphically showing the principal component loadings with the mass-to-charge ratios plotted on the horizontal axis, a factor loading spectrum as shown in FIG. 5 for example can be obtained.

The peak information observed on the $MS^2$ spectrum reflect partial chemical structures of various components which appear on a two-dimensional chromatogram. The result of the principal component analysis performed on the peak information based on this $MS^2$ spectrum shows an overall tendency of the partial chemical structures on the two-dimensional chromatogram. The factor loading spectrum can be considered to be a representation of similar partial chemical structures which exist in a greater amount on the whole. Accordingly, if an $MS^2$ spectrum on the two-dimensional chromatogram has a spectrum pattern which is closer to the factor loading spectrum, it is possible to consider that the component related to that $MS^2$ spectrum has a closer chemical structure to those of the similar partial chemical structures which exist in a greater amount on the whole. Accordingly, the correlation information calculator 36 computes the coefficient of correlation between the peak information of the $MS^2$ spectrum obtained at each micro area and the factor loading spectrum. For a micro area at which no $MS^2$ spectrum has been obtained, the coefficient of correlation can be considered to be zero (i.e. there is no correlation).

The two-dimensional display information creator 37 relates the value of the coefficient of correlation determined for each micro area to a color scale or gray scale, and creates a two-dimensional display image showing the distribution of the coefficient of correlation. This image is displayed on the screen of the display unit 4. Thus, the two-dimensional distribution of components having similar chemical structures to the characteristic component contained in the sample is visualized, with the degree of similarity visually reflected.

In the previous embodiment, the principal component analysis is used as the statistical analysis method. A different analytical method may also be used, examples of which include multivariate analyses, such as the factor analysis, partial least-squares method, PLS determination analysis method, and cluster analysis, as well as analyses utilizing neural networks, such as the self-organizing map analysis. Needless to say, using a different analytical method means that a different kind of feature quantity should be calculated in place of the factor loading, and the correlation of each $MS^2$ spectrum with that feature quantity should be determined.

In the previous embodiment, the principal component analysis is performed regardless of the kind of precursor ion used for acquiring an $MS^2$ spectrum; i.e. the analysis is performed on the peak information originating from $MS^2$ spectra obtained from different kinds of precursor ions. This is based on the assumption that the main peak which appears on a mass spectrum is a molecular-ion peak and this molecular ion is selected as the precursor ion to be subjected to the ion dissociation, so that the peak information of the $MS^2$ spectrum should reflect the chemical structure of the molecule of the original component.

In the previous embodiment, the principal component analysis is applied to the peak information of an $MS^2$ spectrum obtained by performing an $MS^2$ analysis in the MS/MS unit 2. In the case where the MS/MS unit 2 is a mass spectrometer capable of an $MS^n$ analysis with n being equal to or greater than three, the principal component analysis can be applied to the peak information of an $MS^n$ spectrum obtained by performing an $MS^n$ analysis.

The mass spectrum to be analyzed does not need to be an $MS^2$ spectrum obtained by dissociating ions by a CID or similar process in a collision cell or ion trap; it may be any mass spectrum which can practically be regarded as an $MS^2$ spectrum, i.e. which includes a large number of fragment ions reflecting the chemical structure of a component molecule. For example, in a comprehensive two-dimensional GC using a mass spectrometer as the detector, an ion source which employs an electron ionization (EI) method is normally used as the ion source in the mass spectrometer. An EI ion source easily causes fragmentation of the component molecules during their ionization, so that a large number of fragment ions are observed on the mass spectrum while molecular ions are barely observable. Such a mass spectrum can practically be treated as an $MS^2$ spectrum. Accordingly, such a mass spectrum in which a large number of fragment ions are observed can also be used in place of the $MS^2$ spectrum in the previous embodiment.

The same applies to a mass spectrum obtained by in-source decay in which molecular ions are dissociated, for example, by increasing the power of the laser beam in a MALDI ion source or by making use of a collision of those ions with a residual gas in an atmospheric pressure ion source provided in a mass spectrometer.

The previous embodiment is an example in which the present invention is applied in a comprehensive two-dimensional LC-MS/MS system, in which the micro areas at which mass spectra and $MS^2$ spectra are acquired exist in a two-dimensional virtual space with both axes indicating the retention time. However, the N-dimensional space in the present invention may also be a virtual space formed by axes which are different from the retention time. It may also be a real space.

A typical example of the device in which the N-dimensional space is a real space is an imaging mass spectrometer capable of the mass spectrometry imaging of a two-dimensional area on a sample. An imaging mass spectrometer can repeatedly perform a mass spectrometry on micro areas within a two-dimensional area on a sample while two-dimensionally changing the position of the target micro area. By such an operation, a mass spectrum and $MS^2$ spectrum can be obtained for each of the large number of micro areas. Although the axes of the two-dimensional space are not the retention time but the position on the sample, the data structure is essentially the same as shown in FIGS. 2A and 2B. Accordingly, by performing the same data processing as described earlier, it is possible to create and display an image which shows the distribution of components having similar chemical structures to a characteristic component within a two-dimensional area on a sample.

As another example, the present invention can also be applied in a normal type of GC or LC which uses, as the detector, a mass spectrometer capable of an $MS^n$ analysis, such as the triple quadrupole mass spectrometer, Q-TOF mass spectrometer or ion-trap time-of-flight mass spectrometer. Those devices are capable of performing, at a certain retention time (or at retention times which are not exactly the same but can practically be considered as such), a mass spectrometry in which a plurality of kinds of ions (precursor ions) having different mass-to-charge ratios are individually dissociated, to obtain an $MS^2$ spectrum for each precursor ion. If a two-dimensional space with one axis indicating the retention time and the other axis indicating the mass-to-charge ratio of the precursor ion is considered, the data structure will be essentially the same as shown in FIGS. 2A and 2B. Therefore, by performing the same data processing as described earlier, it is possible to visualize the two-dimensional distribution of components having similar chemical structures to a characteristic component contained in the sample, with the degree of similarity visually reflected.

Additionally, it is evident that the previous embodiment and its variations described thus far are mere examples of the present invention, and any change, modification or addition appropriately made within the spirit of the present invention will fall within the scope of claims of the present application.

REFERENCE SIGNS LIST

1 . . . Comprehensive Two-Dimensional LC Unit
2 . . . MS/MS Unit
3 . . . Data Processing Unit
31 . . . Data Storage Section
32 . . . Peak Information Extractor
33 . . . Normalization Processor
34 . . . Principal Component Analysis Processor
35 . . . Factor Loading Calculator
36 . . . Correlation Information Calculator
37 . . . Two-Dimensional Display Information Creator
4 . . . Display Unit

The invention claimed is:

1. A multidimensional mass spectrometric data processing device configured to process and display multidimensional mass spectrometric data acquired for one sample using a mass spectrometer capable of an $MS^n$ analysis (where n is an integer equal to or greater than two), the multidimensional mass spectrometric data including $MS^n$ spectrum data at each micro area on an N-dimensional space which is a real space or virtual space (where N is an integer equal to or greater than two), and the device comprising:
   a) a peak information collector configured to collect, for the each micro area, peak information showing a relationship between a mass-to-charge ratio and a signal intensity, from the $MS^n$ spectrum data at the each micro area on the N-dimensional space;
   b) a statistical analyzer configured to determine a statistical feature quantity by performing a predetermined statistical analytical process on the peak information on the N-dimensional space collected by the peak information collector, and configured to acquire information showing a correlation between the statistical feature quantity and the peak information of the each micro area;
   c) a graph creator configured to create a graph showing an intensity distribution in the N-dimensional space based on the information showing the correlation of the each micro area obtained by the statistical analyzer; and
   d) a display configured to display the graph showing the intensity distribution in the N-dimensional space.

2. The multidimensional mass spectrometric data processing device according to claim 1, wherein:
   the $MS^n$ spectrum data at the each micro area are data obtained by a two-dimensional gas chromatograph or two-dimensional liquid chromatograph using the mass spectrometer capable of an $MS^n$ analysis as a detector, and two axes of a two-dimensional space with N having a value of 2 are both retention times.

3. The multidimensional mass spectrometric data processing device according to claim 2, wherein:
   the statistical analytical process is a principal component analysis, and the feature quantity is a factor loading obtained by the principal component analysis.

4. The multidimensional mass spectrometric data processing device according to claim 2, wherein:
   the mass spectrometer is a device including an ion source in which a fragmentation occurs or a device which employs in-source decay, and the $MS^n$ spectrum data are pseudo $MS^2$ spectrum data acquired by performing a mass spectrometry on fragment ions resulting from the fragmentation or in-source decay in the ion source.

5. The multidimensional mass spectrometric data processing device according to claim 2, wherein:
   the mass spectrometer is a device configured to select, as a precursor ion, an ion having a specific mass-to-charge ratio among ions originating from the sample, for dissociating the precursor ion, and configured to perform a mass spectrometry on ions resulting from dissociation; and
   the statistical analyzer performs a predetermined statistical analytical process on the peak information on the N-dimensional space collected from the $MS^n$ spectrum data originating from precursor ions having a same mass-to-charge ratio.

6. The multidimensional mass spectrometric data processing device according to claim 1, wherein:
   the $MS^n$ spectrum data at the each micro area are data obtained by an imaging mass spectrometer capable of an $MS^n$ analysis, and two axes of a two-dimensional space with N having a value of 2 are position information in different directions on the sample.

7. The multidimensional mass spectrometric data processing device according to claim 6, wherein:

the statistical analytical process is a principal component analysis, and the feature quantity is a factor loading obtained by the principal component analysis.

8. The multidimensional mass spectrometric data processing device according to claim 6, wherein:
the mass spectrometer is a device including an ion source in which a fragmentation occurs or a device which employs in-source decay, and the $MS^n$ spectrum data are pseudo $MS^2$ spectrum data acquired by performing a mass spectrometry on fragment ions resulting from the fragmentation or in-source decay in the ion source.

9. The multidimensional mass spectrometric data processing device according to claim 6, wherein:
the mass spectrometer is a device configured to select, as a precursor ion, an ion having a specific mass-to-charge ratio among ions originating from the sample, for dissociating the precursor ion, and configured to perform a mass spectrometry on ions resulting from dissociation; and
the statistical analyzer performs a predetermined statistical analytical process on the peak information on the N-dimensional space collected from the $MS^n$ spectrum data originating from precursor ions having a same mass-to-charge ratio.

10. The multidimensional mass spectrometric data processing device according to claim 1, wherein:
the statistical analytical process is a principal component analysis, and the feature quantity is a factor loading obtained by the principal component analysis.

11. The multidimensional mass spectrometric data processing device according to claim 1, wherein:
the mass spectrometer is a device including an ion source in which a fragmentation occurs or a device which employs in-source decay, and the $MS^n$ spectrum data are pseudo $MS^2$ spectrum data acquired by performing a mass spectrometry on fragment ions resulting from the fragmentation or in-source decay in the ion source.

12. The multidimensional mass spectrometric data processing device according to claim 1, wherein:
the mass spectrometer is a device configured to select, as a precursor ion, an ion having a specific mass-to-charge ratio among ions originating from the sample, for dissociating the precursor ion, and configured to perform a mass spectrometry on ions resulting from dissociation; and
the statistical analyzer performs a predetermined statistical analytical process on the peak information on the N-dimensional space collected from the $MS^n$ spectrum data originating from precursor ions having a same mass-to-charge ratio.

\* \* \* \* \*